Patented Aug. 11, 1931

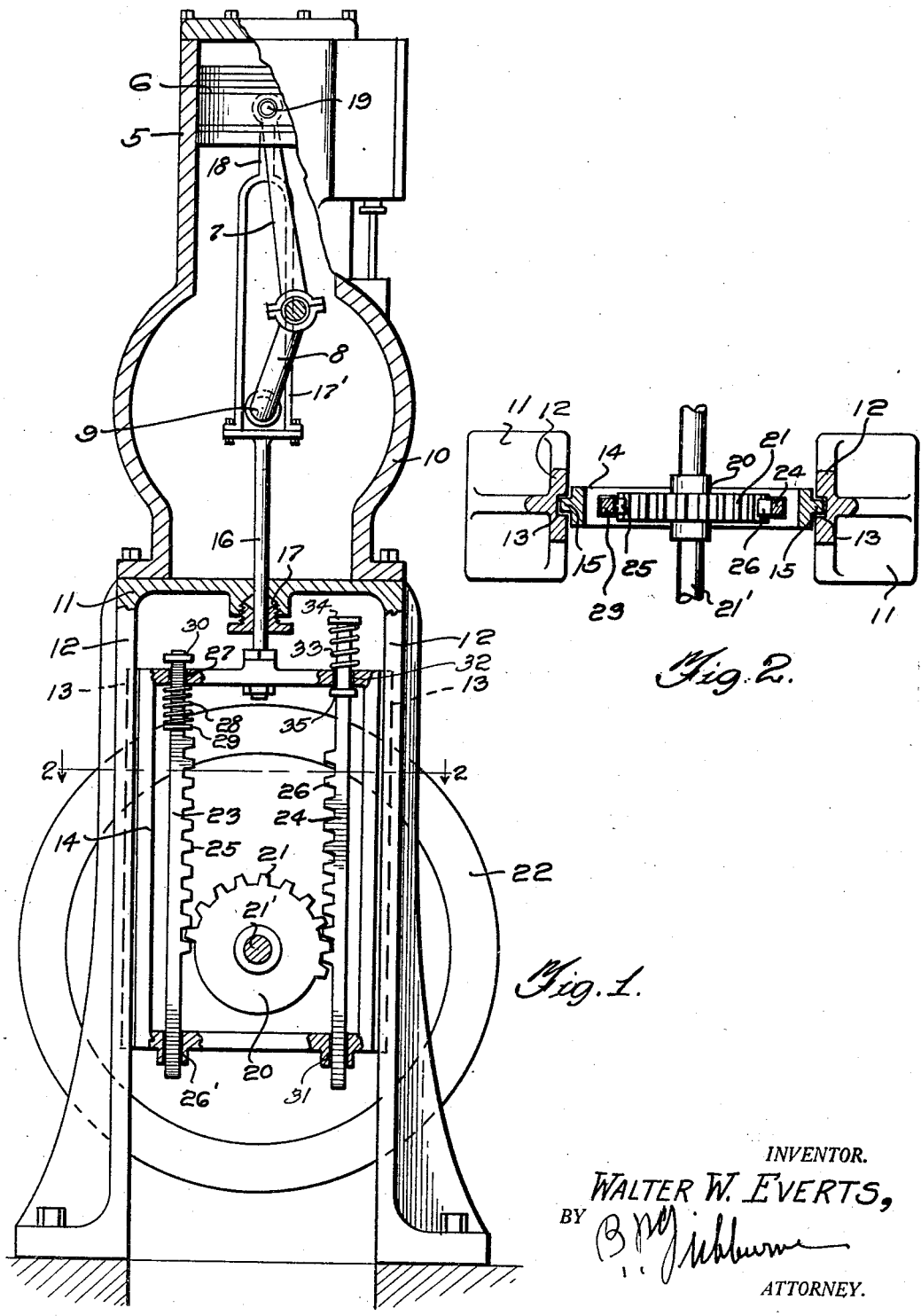

1,818,313

UNITED STATES PATENT OFFICE

WALTER W. EVERTS, OF SAN ANTONIO, TEXAS, ASSIGNOR TO EVERTS-ELLINGTON COMPANY, OF SAN ANTONIO, TEXAS, A CORPORATION OF TEXAS

POWER TRANSMITTING DEVICE

Application filed May 27, 1930. Serial No. 456,183.

My invention relates to apparatus for converting reciprocatory movement into rotary movement.

In accordance with my invention, a rotary pinion is driven by reciprocatory racks, and the construction is such that one rack is at all times in engagement with the pinion, without liability of the stripping of the teeth from the pinion or the rack. In the preferred embodiment of the invention, the racks are carried by a reciprocatory support, and each rack is positively moved in one direction by the support, to turn the pinion, but is movable in an opposite direction with relation to the support at the end of its power stroke, for freeing the teeth of such rack from engagement with the teeth of the pinion.

The apparatus may be used in any place where it is desired to convert a reciprocatory movement into a rotary movement. It is well adapted for use in connection with engines, such as steam engines, internal combustion engines, etc., whereby the maximum leverage is obtainable in the application of the power to the rotary pinion. The construction is simple, strong and practical.

In the accompanying drawings, forming a part of this specification, and in which like numerals are employed to designate like parts throughout the same, Figure 1 is a side elevation of apparatus embodying my invention, parts in section, and, Figure 2 is a horizontal section taken on line 2—2 of Figure 1.

In the drawings, wherein for the purpose of illustration, is shown a preferred embodiment of my invention, the numeral 5 designates a cylinder of an engine, such as a steam engine, which may be of the usual construction. Mounted to reciprocate within the cylinder is a piston 6, having pivotal connection with a connecting rod 7, pivoted to a crank 8, carried by a crank shaft 9. The cylinder is mounted upon a crank case 10.

The crank case is mounted upon a base 11, having vertical standards or sides 12 provided with vertical grooves 13, upon their inner sides.

Mounted to reciprocate within the vertical base is a support 14, preferably in the form of an open rectangular frame. The sides of this support have tongues or ribs 15, mounted for sliding movement within the grooves 13, to be guided thereby. The support or frame 14 has its top rigidly connected with a reciprocatory rod 16 operating through a stuffing box 17. This rod is rigidly connected at its upper end with a yoke 17, to suitably straddle the crank shaft 9, and this yoke is connected at its top with a connecting rod 18, attached to the wrist pin 19 of the piston. A direct straight line connection is, therefore, afforded between the reciprocatory support 14 and the piston.

The numeral 20 designates a rotary driven element, such as a mutilated pinion having teeth 21 extending over a portion of its circumference, preferably slightly more than 180°. The pinion 20 is mounted upon a shaft 21, to rotate therewith, which may be equipped with a fly wheel 22, if desired.

The numerals 23 and 24 designate reciprocatory racks, having teeth 25 and 26 respectively. These racks are preferably square in cross section, so that they will not turn upon their longitudinal axes. The rack 23 has its lower end slidably mounted in an opening 26, formed in the lower end of the support or frame 14, and its upper end slidably mounted in an opening 27 formed in the upper end of the support or frame 14. A compressible coil spring 28 is arranged beneath the upper end of the frame 14 and surrounds the rack and engages a ring or stop 29, rigidily secured to the rack 23. A ring 30 is rigidly secured to the top of the rack 23 and is arranged above the top of the frame 14. The rack 24 has its lower end slidably mounted in an opening 31, formed in the lower end of the frame 14, and its upper end slidably mounted in an opening 32, formed in the upper end of the frame 14. A compressible coil spring 33 is arranged above the top of the frame 14 and engages therewith and surrounds the upper end of the rack 24, projecting above the frame and engages a ring 34 rigidly secured to the rack 24. A ring 35 is rigidly mounted upon the upper portion of the rack 24 adjacent to the upper end of the frame 14 and is adapted to engage with the lower side of the same. The racks 23 and 24 have the teeth 25 and 26, respectively, to engage with the teeth 21 of the mutilated pinion.

The operation of the apparatus is as follows:

When the support 15 is in the uppermost and lowermost positions, the teeth of the pinion 20 engage the teeth of both racks 23 and 24. In Figure 1 of the drawings, the support 14 is moved downwardly a short distance from the uppermost position and the teeth 26 of the rack 24 are engaging the teeth 21 of the pinion 20, while the end tooth 21 of the pinion is in the act of disengaging the lower teeth 25 of the rack 23. The rack 23 is being shifted upwardly longitudinally with respect to the support 32, compressing the spring 28, while the rack 24 is positively moving downwardly with the support 14 as ring 35 is in engagement with the support. Further downward movement of the support 14 will cause rack 24 to turn pinion 20 and the teeth thereof will disengage the teeth of the rack 23. When the support 14 reaches or approaches the end of its down stroke, the end tooth of the pinion 20 will engage the lower tooth 25 of rack 23 before the opposite end tooth of the pinion disengages the lower tooth 26 of the rack 24. Further turning of the pinion 20 will cause the end tooth of the pinion to disengage the lowermost tooth 26 of rack 24, this disengagement being rendered possible by the rack 24 being then moved downwardly slightly with respect to the support 14, in opposition to the spring 33. When the support 14 moves upwardly, rack 23 is positively moved upwardly by ring 30 engaging above the upper end of the support. The cycle of operation is repeated when the support reaches its uppermost position and again starts upon the down stroke.

It is to be understood that the form of my invention, herewith shown and described, is to be taken as a preferred example of the same, and that various changes in the shape, size and arrangement of parts, may be resorted to, without departing from the spirit of my invention, or the scope of the subjoined claims.

Having thus described my invention, I claim:—

1. In a power transmitting device, a reciprocatory support, a rotary mutilated pinion having teeth, racks carried by the support and arranged upon opposite sides of the mutilated pinion and having teeth to engage the teeth of the pinion, and means whereby each rack is positively moved by the support in one direction and is movable in an opposite direction with relation to the support.

2. In a power transmitting device, a reciprocatory support, a rotary mutilated pinion having teeth, racks arranged upon opposite sides of the pinion and having teeth to engage the teeth of the pinion and carried by the support, means whereby each rack is positively moved longitudinally in one direction with the support and movable longitudinally in an opposite direction with relation to the support, and means to move the reciprocatory support.

3. In a power transmitting device, a reciprocatory support, a rotary mutilated pinion having teeth, spaced racks arranged upon opposite sides of the mutilated pinion and having teeth to engage the teeth of the pinion and carried by the support, means whereby each rack is positively moved longitudinally in one direction with the support and movable longitudinally in an opposite direction with relation to the support, yielding means to oppose such relative longitudinal movement of each rack, and means to move the reciprocatory support.

4. In a power transmitting device, a reciprocatory support, a rotary mutilated pinion having teeth, spaced racks extending longitudinally of the direction of travel of the support and arranged upon opposite sides of the mutilated pinion and having teeth to engage the teeth of the pinion, means whereby the racks slidably engage the support, a stop element carried by one rack and engaging one side of the support, a stop element carried by the other rack and engaging the opposite side of the support, the arrangement being such that each rack is positively moved longitudinally in one direction with the support and movable in an opposite direction with relation to the support, and a spring to oppose the relative longitudinal movement of each rack.

5. In a power transmitting device, a reciprocatory support, having spaced guide means extending longitudinally of its direction of travel, racks slidably mounted within guide means and having teeth, a stop carried by one rack engaging one side of the support, a stop carried by the other rack and engaging the opposite side of the support, a spring carried by one rack and engaging one side of the support, a spring carried by the other rack and engaging the opposite side of the support, a mutilated pinion arranged between said racks and having teeth to engage the teeth of the racks, and means to reciprocate the support.

6. In a power transmitting device, a mutilated pinion having teeth, a pair of spaced racks having teeth and arranged upon opposite sides of the mutilated pinion to engage the opposite sides of the pinion, means to reciprocate the racks and positively guide the same in such reciprocatory movement, and means whereby the racks are relatively movable longitudinally with relation to the first named means.

7. In a power transmitting device, a guide, a reciprocatory frame engaging the guide, a pair of racks having teeth carried by the frame and extending longitudinally of the direction of travel of the frame and spaced laterally, means whereby each rack is moved longitudinally in a positive manner in one direction by the frame and is relatively movable in an opposite longitudinal direction with relation to the frame, the relative longitudinal movements of the racks being in opposite directions, a mutilated pinion arranged between the racks for engagement therewith, and means to reciprocate the frame.

8. In a power transmitting device, a guide, a reciprocatory frame mounted within the guide and having pairs of openings in its opposite ends, a pair of racks slidably mounted within the openings and having teeth, stops carried by the racks and engaging opposite sides of one end, springs carried by the racks and engaging opposite sides of one end, a mutilated pinion arranged to be engaged between the racks by said racks, and means to reciprocate the frame.

In testimony whereof I affix my signature.

WALTER W. EVERTS.